United States Patent [19]

Dyson et al.

[11] 4,151,144

[45] Apr. 24, 1979

[54] GLOSS EMULSION PAINT CONTAINING A BINDER LATEX AND TWO COPOLYMERS WHICH ARE SALTS OR COPOLYMERS OF UNSATURATED MONOCARBOXYLIC ACID AND AN UNSATURATED ESTER

[75] Inventors: Allen F. Dyson, Bradford; David Marshall, Mirfield, both of England

[73] Assignee: Allied Colloids Limited, Bradford, England

[21] Appl. No.: 852,773

[22] Filed: Nov. 18, 1977

[51] Int. Cl.$^2$ .............................................. C08L 33/02
[52] U.S. Cl. .................... 260/29.6 WB; 260/29.6 RW
[58] Field of Search .............. 260/29.6 WB, 29.6 RW

[56] References Cited

U.S. PATENT DOCUMENTS

| | | | |
|---|---|---|---|
| 3,324,063 | 6/1967 | Teot | 260/29.6 WB |
| 3,840,487 | 10/1974 | Dyson et al. | 260/29.6 H |
| 4,058,499 | 11/1977 | Sekmakas et al. | 260/29.6 WB |

FOREIGN PATENT DOCUMENTS 1375731  11/1974  United Kingdom ............... 260/29.6 H

*Primary Examiner*—Maurice J. Welsh
*Attorney, Agent, or Firm*—Lawrence Rosen; E. Janet Berry

[57] ABSTRACT

A gloss emulsion paint having improved gloss and flow properties is achieved by incorporating in the latex at least two gloss improving film forming copolymers of an unsaturated monocarboxylic acid with an unsaturated monocarboxylic acid ester, one of the copolymers having an average molecular weight of from 10,000 to 20,000 and containing 5 to 20 mole percent of the acid units and the other having an average molecular weight of 50,000 to 150,000 and containing from 5 to 40 mole percent of the acid units.

8 Claims, No Drawings

GLOSS EMULSION PAINT CONTAINING A BINDER LATEX AND TWO COPOLYMERS WHICH ARE SALTS OR COPOLYMERS OF UNSATURATED MONOCARBOXYLIC ACID AND AN UNSATURATED ESTER

Over the past decade there has been an increasing interest in the development of water based gloss paints. By "gloss" we mean a finish substantially more glossy than the matt finish of traditional emulsion paints, namely finishes such as silk, satin, semi gloss or full gloss finishes. The reason for this interest initially was one of convenience and economy arising from the use of water instead of expensive organic solvent. However as legislation becomes stricter on the use of solvents because of their pollution potential and fire hazard, then the use of water as the principal solvent becomes increasingly attractive as a way of also reducing pollution and danger.

Any emulsion paint necessarily comprises water, pigment, binder latex and additives and in practice is an intimate mixture of a dispersion of the pigment and the binder latex. The additives include stabilisers for stabilising the dispersion and the latex, e.g. dispersing, emulsifying and thickening agents and flow control agents.

It is only during the past few years that fruitful efforts have been made to develop emulsion polymers that are suitable as the binder latex in gloss water paints but polymers are now available that have adequate minimum film forming temperature and exterior durability such that they can serve as the binder latex in gloss emulsion paints. In particular emulsion polymers are now available that can be formulated into a gloss water paint to give adequate properties with regard to gloss and flow provided that only small areas, e.g. door and window surrounds, are to be covered by the system. These copolymers include all acrylic binders based on methyl methacrylate/butyl acrylate and methyl methacrylate/2-ethyl hexyl acrylate for example. The disadvantages of the water gloss systems at present available are the lack of adequate flow to enable large areas to be coated without undue striations in the dried film and poor ultimate gloss development compared to nonaqueous solvent based systems, such as conventional solvent alkyd paint. Thus at present gloss emulsion paints are usually given names indicating that they do not yield high gloss finishes, e.g. "satin finish," or "silk finish."

The choice of the additives in the paint significantly affects the flow and gloss characteristics of the paint. Thickening agents and flow control agents currently used in aqueous emulsion paints, e.g. cellulosic derivatives and various commercially available acrylic copolymers, can in fact lead to a loss of gloss and an impairment in flow out of the coating after application.

We have described in our British Patent Specification No. 1,375,731 and in U.S. Pat. No. 3,840,487 aqueous emulsion gloss paints which comprise a blend of a binder latex and a pigment dispersion containing as dispersing agents preferably from 0.01 to 1% based on the weight of pigment of a polymer having an average molecular weight preferably not above 5000 and which is an ammonium or alkali metal salt of a copolymer of an unsaturated monocarboxylic acid of the formula:

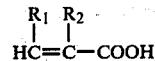

and an unsaturated carboxylic acid ester of the formula:

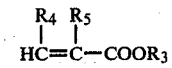

in which $R_1$, $R_2$, $R_4$ and $R_5$ may be the same or different and are hydrogen or methyl and $R_3$ is alkyl containing from 1 to 8 carbon atoms. In particular the copolymer contains from 40 to 95 mole percent of the unsaturated monocarboxylic acid and from 5 to 60 mole percent of the ester. The use of such dispersing agents for the pigment gives improved gloss and opacity.

We have now found that the gloss of an emulsion paint comprising a pigment dispersion intimately mixed with a binder latex and including stabilisers for stabilising the dispersion and the latex can be improved if the paint additionally includes first and second gloss improving, film forming, copolymers each of which is an alkali metal, ammonium or organic amine salt of a copolymer of an unsaturated monocarboxylic acid of the formula:

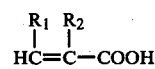

with an unsaturated acid ester of the formula;

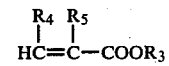

wherein $R_1$, $R_2$, $R_4$ and $R_5$ may be the same or different and are hydrogen or methyl and $R_3$ is an alkyl group containing from 1 to 4, preferably 1 or 2, carbon atoms, the first copolymer having an average molecular weight between 10,000 and 20,000 and containing 5 to 20 mole percent of the unsaturated acid units and 95 to 80 mole percent of the ester units, the second copolymer having an average molecular weight between 50,000 and 150,000 and containing 5 to 40 mole percent of the acid units and 60 to 95 mole percent of the ester units, the percentages being based on the total amount of ester and acid units.

Thus in the invention such copolymers are included in an emulsion paint that already contains sufficient dispersing agents, emulsifying agents or other stabilisers for the pigment dispersion, latex and paint, and the additives of the invention have little or no dispersing properties. In fact the higher molecular weight additives at least may have some flocculating properties and may necessitate the addition of rather more dispersing or emulsifying agent to compensate for this than would otherwise be necessary.

The emulsion paints of the invention are best made by forming a pigment dispersion with a suitable dispersing agent and then intimately mixing this with the binder latex, for example in conventional manner, the gloss improving copolymer generally being mixed into the resultant product but sometimes being mixed with the latex before the addition of the dispersion.

Preferred first copolymers contain from 8 to 20, preferably 10 to 20, mole percent of the acid groups, and have an average molecular weight of 15,000 to 20,000, preferably about 15,000. They are conveniently made by solution polymerisation, for example using solvents such as alcohols, especially methyl alacohol, ethyl alcohol, n-propyl alcohol and isopropyl alcohol. The choice of solvent and other reaction conditions controls the molecular weight and the viscosity of the resultant solution. Polymerisation is generally conducted at an acidic pH. The solution copolymer is generally neutralised by adding alkali to a pH of at least 7, but alternatively can be neutralised in the paint itself since that is generally alkaline. The amount of the first copolymer is generally 0.1 to 5.0% by weight based on the total weight of the paint, most preferably 0.2 to 2.0%.

Preferred second copolymers contain less than 39%, preferably from 10 to 30 mole percent of the acid groups and have a molecular weight of from 70,000 to 120,000, preferably 75,000. These high molecular weight polymers serve as thickening agents and flow improvers as well as gloss improvers and so when they are present it is possible to eliminate some or all of the conventional thickening agents, such as cellulose derivatives, that would otherwise be expected to be present in the emulsion paint. They are best made by emulsion polymerisation in conventional manner. Usually the polymerisation is conducted at an acidic pH and the polymer is neutralised either by adding alkali until it has a pH of 7 or higher or, more usually, simply by incorporating it in the emulsion paint, since that usually has a pH above 7. The amount of this copolymer incorporated in the emulsion paint is generally from 0.1 to 5% by weight, based on the total weight of the paint, most preferably from 0.4 to 2.0%.

Any neutralisation that is effected for either copolymer can be effected using any convenient alkali. The preferred alkali is ammonium hydroxide with the result that the preferred copolymers are in the form of their ammonium salts.

Although it is possible to make suitable acid-ester copolymers by various methods the copolymers used in the invention are preferably formed simply by polymerising the desired starting monomers together in the desired proportions by conventional free radical polymerisation procedures either in a solvent system or as an emulsion system as described above.

Suitable acids include acrylic and methacrylic acid. Suitable esters that may be used as one of the monomers from which the copolymers are formed include, methyl acrylate, ethyl acrylate, propyl acrylate, methyl methacrylate and ethyl methacrylate. Thus generally $R_1$ and $R_4$ are both hydrogen.

The copolymers may contain units addition to those of the specified acids and esters, the copolymers then being, for instance, terpolymers or tetrapolymers. However such additional components in the copolymers do not usually seem to offer any particular advantage and so are usually avoided. However if they are included they will generally be present only in small amounts, e.g. less than 25 mole percent and preferably less than 10 mole percent, based on the total polymer.

The stabilising agents, such as dispersing and emulsifying agents, that are present in the paint, may be conventional. However it is particularly preferred to use as the dispersing agent for the pigment a dispersing agent as described in our U.S. Patent Specification No. 3,840,487.

Good results are obtainable in the invention using a wide range of differing binder latices. Examples are all-acrylic copolymers, e.g. methyl methacrylate/butyl acrylate, acrylic/vinyl acetate copolymers, e.g. 2-ethyl hexyl acrylate/vinyl acetate, vinyl acetate/ethylene copolymers and vinyl acetate/Veova copolymers. "Veova" is sold by and is a trade mark of Shell Chemical Limited and is a vinyl ester with various highly branched synthetic carboxylic acids.

Typical preparations of second copolymers suitable for use in the invention are:

Preparation 1

30 parts by weight of methacrylic acid were mixed with 70 parts by weight methyl acrylate and 0.2 parts by weight of lauryl mercaptan and added over a period of 1 hour to a mixture of 150 parts by weight of water containing 0.5 parts by weight of a nonyl phenol ethylene oxide condensate surfactant (25 mols. of ethylene oxide) and 0.2 parts by weight of ammonium persulphate at 80° C. The resultant copolymer emulsion had a viscosity of 50 cp (Brookfield 20 r.p.m., spindle 1). The average molecular weight of the copolymer was 75,000. The liquid product was termed product A.

Preparation 2

20 parts by weight of methacrylic acid were mixed with 80 parts of n-butyl methacrylate and 0.1 parts of lauryl mercaptan and added over a period of one hour to a mixture of 150 parts by weight of water containing 0.5 parts of a nonyl phenol ethylene oxide condensate surfactant (25 mol. of ethylene oxide) and 0.2 parts of ammonium persulphate at 80° C. The resultant copolymer emulsion had a viscosity of 70 cp. (Brookfield spindle 1). The average molecular weight of the copolymer was 120,000. The liquid product was termed product B.

Typical preparations of first copolymers for use in the invention are:

Preparation 3

15 parts by weight of acrylic acid were mixed with 70 parts by weight of ethyl acrylate, 15 parts by weight of methyl methacrylate and 1.0 parts by weight of 2-mercapto ethanol. The mixture is added over a period of two hours to 100 parts by weight of ethyl alcohol containing 0.6 parts by weight of an azo catalyst. The copolymer was neutralised to pH 7 with ammonium hydroxide and the ethyl alcohol removed by distillation and replaced by addition of water to produce a solids content of 30%. The neutralised solution polymer had a viscosity of 5,000 cp. (Brookfield 20 r.p.m., spindle 4) and an average molecular weight of 15,000. The liquid product was termed product C.

Preparation 4

The process of Preparation 3 was repeated except that the product was made from 12 parts by weight methacrylic acid, 33 parts by weight ethyl acrylate and 55 parts by weight methyl methacrylate. The product was termed product D.

The following are Examples of paints, Examples 1 and 4 to 8 being comparative Examples while Examples 2, 3 and 9 are Examples of the invention. The paint prepared in each Example was applied to a gloss plate at a wet film thickness of 0.003" and air dried for 48 hours. The film was then assessed for gloss using an EEL 45° gloss head. The higher is the reading the better is the gloss. Flow was assessed by brushing the paint onto glass and grading from 1 (poor) to 7 (excellent). The results are given in Table 1.

EXAMPLE 1

19.5 gm. of rutile titanium dioxide, 9 gm. of water, 0.4 gm. of a polyacrylate dispersing agent as described in U.S. Pat. No. 3,840,487 and sold under the trade name Dispex G40, 0.3 gm. of ammonium hydroxide, 5 gm. of propylene glycol, 1.8 parts of butyl "Carbitol" (trade mark) were blended together in a high speed caviation disperser. After 10 minutes 63 gm. of an all acrylic copolymer latex and 1 gm. of a medium molecular weight conventional cellulosic thickener "(Natrosol" 250 MR) were added. "Natrosol" is a trade mark.

EXAMPLE 2

The process of Example 1 was repeated except that the amount of water was 3.6 gm., and the amount of ammonium hydroxide was 0.5 gm. and the cellulosive thickener was omitted, and 3.8 gm. of product C and 2.4 gm. of product A were blended into the pigment-latex mixture. The amounts by weight solids of products A and C based on the total mix were 1.0 and 1.1% respectively.

EXAMPLE 3

The process of Example 1 was followed except that the amount of water was 5 gm., the cellulosic thickener was omitted and 2 gm. of product C and 3.5 gm. of product A were blended into the pigment-latex mixture on a solids basis. The amounts by weight solids of products A and C based on the total mix were 1.4 and 0.6% respectively.

EXAMPLE 4

The process of Example 1 was followed except that the amount of water was 3 gm., the amount of ammonium hydroxide was 0.4 gm., the cellulosic thickener was omitted and 2.8 gm. of product A was blended into the pigment-latex mixture. The amount by weight solids of product A based on the total mix was 1.1%.

EXAMPLE 5

55 parts by weight of titanium dioxide, 43 parts of water, 1.4 parts by Dispex G40, 2.0 parts of ammonium hydroxide and 13 parts of propylene glycol were blended together in a high speed caviation disperser. After 10 minutes, 160 parts of Pollimul 1175 (a vinyl acetate-Veova Copolymer latex) and 2.6 parts of a medium molecular weight conventional acrylic thickener were added. Antifoam and preservative were added as required.

EXAMPLE 6

The process of Example 5 was repeated except that 28 parts of water were used and 13.3 parts of product C were added instead of the conventional thickener. The amount by weight solids of product C based on the total mix was about 1.4%.

EXAMPLE 7

The process of Example 6 was repeated except that 23 parts of water were used and in addition 1.3 parts of the conventional acrylic thickener were added.

EXAMPLE 8

The process of Example 5 was repeated except that 32 parts of water were used and 2.6 parts of product A were added instead of the conventional thickener. The amount by weight solids of product A by weight of the total mix was about 0.4%.

EXAMPLE 9

The process of Example 5 was repeated except that 24 parts of water, 1.1 parts of Dispex G40, 1.3 parts of ammonium hydroxide, 13.7 parts of propylene glycol were used and 144 parts Pollimul 1175, 16.6 parts of product D and 4.6 parts of product A were added. The amount by weight solids of products A and D by weight of the total mix was about 0.7 and 1.9% respectively.

TABLE 1

| Paint from Example No. | Latex type | Copolymer Additive | 45° Gloss | Flow rating (1–7) |
|---|---|---|---|---|
| 1 | all acrylic | — | 63 | 2–3 |
| 2 | " | A + C | 83 | 7 |
| 3 | " | A + C | 81 | 6–7 |
| 4 | " | A | 76 | 6 |
| 5 | vinyl acetate/Veeva | — | 63 | 3 |
| 6 | " | C | 77 | 5–6 |
| 7 | " | C | 72 | 5 |
| 8 | " | A | 73 | 3 |
| 9 | " | A + D | 84 | 6–7 |

It will be noted that the flow rating for each of the Examples of the invention, 3, 2 and 9, was higher than for any of the other Examples, and that the gloss value for each of the Examples of the invention was very much higher than the gloss value for any of the other Examples. Also Examples 4 and 6 to 8 show that an improvement in gloss is obtainable merely by the use of one of the copolymers alone, compared to products such as those exemplified in U.S. Pat. No. 3,840,487 where neither of the copolymers is incorporated. However it is apparent that the use of the two different copolymers together gives better results than are obtainable by the use of increased amounts of one copolymer by itself.

We claim:

1. A gloss emulsion paint comprising a pigment dispersion intimately mixed with a binder latex and including stabilisers for stabilising the dispersion and the latex, and which additionally includes first and second gloss improving, film forming, copolymers each of which is an alkali metal, ammonium, or organic amine salt of a copolymer of an unsaturated monocarboxylic acid of the formula:

$$\begin{matrix} R_1 & R_2 \\ | & | \\ HC=C-COOH \end{matrix}$$

with an unsaturated acid ester of the formula:

$$\begin{matrix} R_4 & R_5 \\ | & | \\ HC=C-COOR_3 \end{matrix}$$

in which $R_1$, $R_2$, $R_4$ and $R_5$ may be the same or different and are hydrogen or methyl and $R_3$ is an alkyl group containing 1 to 4 carbon atoms and in which the first copolymer has an average molecular weight between 10,000 and 20,000 and contains 5 to 20 mole percent of the unsaturated acid units and 95 to 80% of the ester units and the second copolymer contains 5 to 40 mole percent of the acid groups and 60 to 95 mole percent of the ester groups, and has an average molecular weight of 50,000 to 150,000, the percentages being based on acid plus ester.

2. A paint according to claim 1 containing from 0.1 to 5% by weight of each of the copolymers.

3. A paint according to claim 1 containing from 0.2 to 2.0% by weight of the first copolymer.

4. A paint according to claim 1 containing from 0.4 to 2% by weight of the second copolymer.

5. A paint according to claim 1 in which the first copolymer contains 8 to 20 mole percent of the acid groups, based on acid plus ester.

6. A paint according to claim 1 in which the second copolymer contains from 10 to 30 mole percent of the acid groups, based on acid plus ester.

7. A paint according to claim 1 in which the first copolymer has a molecular weight of 15,000 to 20,000 and the second copolymer has a molecular weight of 70,000 to 120,000.

8. A paint according to claim 1 in which $R_3$ is methyl or ethyl, and $R_1$ and $R_4$ are both hydrogen.

* * * * *